(12) United States Patent
Ramond et al.

(10) Patent No.: US 8,356,511 B2
(45) Date of Patent: Jan. 22, 2013

(54) DEVICE INCLUDING A PRESSURE SENSOR FOR MEASURING PRESSURES INSIDE THE COMBUSTION CHAMBER OF AN ENGINE

(75) Inventors: Alain Ramond, Merville (FR); Sandro Goretti, Northwich Cheshire (GB); John Burrows, Rubiera (IT)

(73) Assignees: Continental Automotive France, Toulouse (FR); Federal-Mogul Italy Srl, Carpi (MO) (IT)

( * ) Notice: Subject to any disclaimer, the term of this patent is extended or adjusted under 35 U.S.C. 154(b) by 111 days.

(21) Appl. No.: 13/062,369

(22) PCT Filed: Sep. 4, 2009

(86) PCT No.: PCT/FR2009/001061
§ 371 (c)(1),
(2), (4) Date: May 11, 2011

(87) PCT Pub. No.: WO2010/026316
PCT Pub. Date: Mar. 11, 2010

(65) Prior Publication Data
US 2011/0214494 A1 Sep. 8, 2011

(30) Foreign Application Priority Data
Sep. 8, 2008 (FR) .................................... 08 04924

(51) Int. Cl.
*G01M 15/08* (2006.01)
(52) U.S. Cl. .................................................. 73/114.16
(58) Field of Classification Search .............. 73/114.16
See application file for complete search history.

(56) References Cited

U.S. PATENT DOCUMENTS

| 7,337,657 | B2 * | 3/2008 | Haussner et al. | ........... 73/114.18 |
|---|---|---|---|---|
| 7,581,520 | B2 * | 9/2009 | Kern et al. | ................ 123/145 A |
| 7,712,444 | B2 * | 5/2010 | Kern et al. | ................ 123/145 A |
| 7,825,352 | B2 * | 11/2010 | Last et al. | ...................... 219/270 |
| 8,250,909 | B2 * | 8/2012 | Kern et al. | ................ 73/114.16 |
| 2007/0227487 | A1 | 10/2007 | Last et al. | |
| 2010/0122975 | A1 * | 5/2010 | Burrows et al. | .............. 219/267 |
| 2010/0186489 | A1 * | 7/2010 | Burrows et al. | ........... 73/114.19 |
| 2010/0186490 | A1 * | 7/2010 | Burrows et al. | ........... 73/114.19 |
| 2010/0229624 | A1 * | 9/2010 | Higuchi et al. | ................ 73/1.57 |
| 2011/0192358 | A1 * | 8/2011 | Ramond et al. | ................... 123/2 |

FOREIGN PATENT DOCUMENTS

DE 102006059693 A1 6/2008
WO 2005/111501 A1 11/2005

OTHER PUBLICATIONS

International Search Report, dated Dec. 2, 2009, from corresponding PCT application.

* cited by examiner

*Primary Examiner* — Freddie Kirkland, III
(74) *Attorney, Agent, or Firm* — Young & Thompson

(57) ABSTRACT

A device includes a pressure sensor (11-13) for measuring pressures inside the combustion chamber of a cylinder in an internal combustion engine. The device includes: an outer body (1); a lug (5) extending partially into the combustion chamber; an inner housing (14) inserted into the body and surrounding an upper portion of the lug, the housing being secured to the lug and to the body and having an elastically deformable portion (17) between the two securing areas, characterized in that the housing (14) is secured to the body (1) at a securing area (18) extending in the upper portion of the body.

16 Claims, 2 Drawing Sheets

Figure 1:
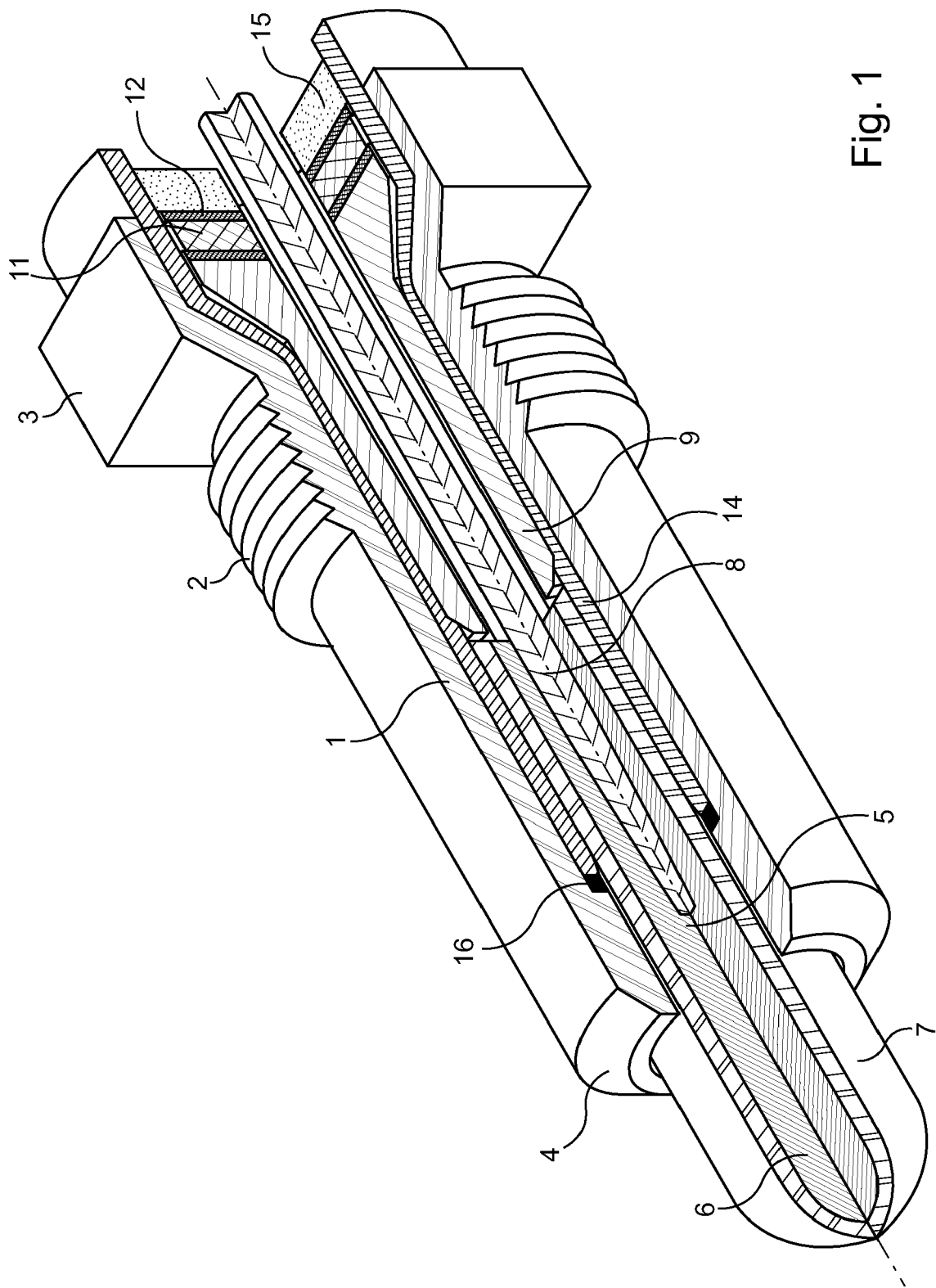

DEVICE INCLUDING A PRESSURE SENSOR FOR MEASURING PRESSURES INSIDE THE COMBUSTION CHAMBER OF AN ENGINE

The present invention concerns a device incorporating a pressure sensor for measuring pressures in a cylinder of an internal combustion engine.

In an internal combustion engine, especially a diesel engine, each cylinder typically includes a glow plug for heating the combustion chamber of said cylinder, especially when starting the engine. To this end, this glow plug includes a finger in which a preheating electrode is accommodated, and which extends in the combustion chamber.

A glow plug of this kind is placed in a bore through the cylinder head. This bore includes on the one hand a thread near an exterior face of the cylinder head and on the other hand a conical abutment near an interior face of the cylinder head delimiting the combustion chamber. In a complementary way, the glow plug includes a body having on the one hand a thread that comes to be fastened into the thread of the bore in order to fix—by screwing—the glow plug to the cylinder head. This body further includes, at its lower end, a conical seat that comes to bear (at the end of screwing it in) against the conical abutment of the bore and thus seal the combustion chamber.

It is known to incorporate a pressure sensor into this kind of glow plug. It has been found that knowing the pressure inside each cylinder improves control of combustion in the engine. This information is used to regulate the injection of fuel into each of the cylinders. Thus the fuel consumption of the engine can be optimized and polluting emissions reduced.

This sensor can be placed just above the preheating finger of the glow plug.

It is also known, alternatively, to house the sensor in a portion of the glow plug called the glow plug head that extends outside the cylinder and the cylinder head or to mount the sensor on said glow plug head. This arrangement enables the use of a sensor that is larger and therefore of greater sensitivity, on the one hand, and a preheating electrode that is of greater diameter and therefore of greater efficacy, on the other hand. Moreover, arranged in this way, the sensor is not exposed to the temperatures in the combustion chamber.

In this kind of glow plug, it is therefore necessary to transmit the pressure inside the combustion chamber of the cylinder to the pressure sensor disposed in or on the glow plug head outside said cylinder. Various arrangements have been presented so that forces exerted on the preheating finger located in the cylinder are transmitted to the pressure sensor.

Thus WO 2005/111501 proposes a glow plug including:
  a body, a preheating finger and a pressure sensor as described hereinabove, which sensor includes a piezo-electric element and two contact members disposed on either side of said piezo-electric element,
  a tubular intermediate part inserted in the body and surrounding the preheating finger to isolate it from said body; the lower end of this intermediate part is fixed to the preheating finger, said intermediate part is moreover fixed to the body at the level of the seat thereof, and, between these two fixing areas, the intermediate part includes an elastically deformable portion that enables the preheating finger to be moved axially by pressure variations in the combustion chamber; this deformable portion is therefore entirely inside the combustion chamber,
  a tubular spacer extending axially between the preheating finger and the pressure sensor to transmit movements of the preheating finger to said sensor; this spacer is freely mounted in the intermediate part and has passing freely through it a core supplying electrical power to the electrode of the preheating finger.

It is also known in some diesel engines (generally large cubic capacity engines) and petrol engines to provide a dedicated device for measuring the pressure in the combustion chamber of a cylinder of the engine. This kind of device has a body with means for anchoring it to the cylinder head and inside which is a pressure sensor. Like a glow plug, it usually also includes a finger in the combustion chamber movements whereof generate axial forces measured by the pressure sensor in order to determine the pressure in the combustion chamber. This finger has no preheating electrode, however. It may therefore take different forms, other than that of a "finger" such as a short cylinder or flat plate exposed in the combustion chamber. Such devices are sometimes referred to as stand-alone pressure sensors (SAPS). The present invention also relates to such pressure measuring devices. For simplicity, the features described in the remainder of the description for a glow plug of the invention (with the exception of the features linked only to the preheating function of the glow plug) apply equally to SAPS type pressure measuring devices of the invention, even if this is not explicitly stated.

The invention aims to provide a device, such as a glow plug or a SAPS type measuring device, incorporating a pressure sensor for measuring pressures in a cylinder of an internal combustion engine, that has increased sensitivity compared to the prior art devices and in particular the device described in WO 2005/111501.

Another object of the invention is to propose a more reliable device.

The device of the invention is described hereinafter in a position in which it has a substantially vertical axial direction and a finger located at the bottom. The adjectives "upper" and "lower" used to qualify elements or parts of the device refer to this specific position.

The invention concerns a device incorporating a pressure sensor for measuring pressures in a combustion chamber of a cylinder of an internal combustion engine, including:
  an external body,
  a finger adapted to extend partly in the combustion chamber,
  an internal envelope inserted into the body and surrounding an upper portion of the finger, which envelope is fixed on the one hand to the finger and on the other hand to the body and has an elastically deformable portion between these two fixing areas.

The device of the invention is characterized in that the envelope is fixed to the body in a fixing area that is in an upper part of said body.

In the usual way, the elastically deformable portion of the envelope enables the finger to be moved by the pressure in the combustion chamber and the device advantageously includes means, for example a rigid spacer and a retaining member as defined hereinafter, for transmitting axial forces resulting from movements of the finger to the pressure sensor. The sensitivity of the sensor therefore depends directly on the deformability of the envelope as a function of the pressure to which the finger is subjected. In contrast to the envelope of the invention, the intermediate part of the glow plug described in WO 2005/111501 is fixed to the seat of the body, i.e. to the lower end thereof. The envelope of the invention can therefore have a deformable portion that is longer than the prior intermediate part of WO 2005/111501, which considerably increases the sensitivity of the device of the invention.

In the usual way, the body of the device of the invention includes anchor means, such as an external thread, for anchoring the device in a bore formed in a cylinder head. It also preferably includes a conical seat adapted to come to bear on a conical abutment in the bore to provide a seal. When the device is mounted in the cylinder head, said body is therefore fastened to the cylinder head in two regions spaced from each other along its axial direction, i.e. in the direction of the thickness of the cylinder head. The portion of the body extending between the anchor means and the seat on the body is consequently subjected to the distortions of the cylinder head which may occur as an effect of temperature, pressure, the tightening torque of the device or mechanical forces. In the device of the invention, the area for fixing the envelope to the body extends advantageously above the anchor means of said body. Thus distortion of the cylinder head does not impact on the envelope (which constitutes the sensitive element of the device); deformation of the latter is therefore a function only of the pressure in the combustion chamber, which makes the device of the invention very reliable.

The elastically deformable portion of the envelope advantageously extends entirely inside the body and is therefore not exposed to the temperature in the combustion chamber and in particular to fast variations therein. In contrast, the deformable portion of the intermediate part from WO 2005/111501 extends in the combustion chamber and consequently subjected to thermal shocks likely to modify (at equal pressure) the length of its deformable portion and thus to falsify the pressure measurements. This type of measurement error is prevented in the device of the invention, which increases its reliability.

The lower end of the envelope preferably also extends inside the body. The envelope is therefore entirely contained within the body, with the possible exception of its upper end, which can project from that of the body (outside the cylinder).

The device of the invention advantageously includes a damping element between the body and the envelope that is thermally conductive and adapted to damp radial vibrations of the envelope without impeding axial deformation of the envelope and preferably without transmitting to the envelope axial forces resulting from the axial forces to which the body is subjected, or at the very least minimizing any axial forces transmitted. This damping element on the one hand evacuates any heat absorbed by the envelope to the body and then to the cylinder head and on the other hand, in conjunction with the area for fixing the envelope to the body, avoids any vibration mode of the envelope, the occurrence of which could interfere with the pressure measurements. Finally, this damping element is advantageously adapted to provide a seal between the body and the envelope.

The damping element is advantageously placed as low as possible to avoid forming a cavity between the body and the envelope. It is therefore preferably disposed between the lower end of the envelope and the body.

The device of the invention advantageously includes a retaining member, such as an externally threaded nut, fixed to the envelope and against which an upper face of the pressure sensor bears. In other words, the upper face of the pressure sensor is fastened to the envelope (via the retaining member) and the pressure sensor is immobilized against upward movement in axial translation.

Moreover, the device includes a rigid spacer surrounded by the envelope and on which a lower face of the pressure sensor bears. The envelope is advantageously fastened to a lower end of this spacer and its elastically deformable portion is advantageously situated between the lower end of the spacer and the area for fixing the envelope to the body. To this end, the envelope has a shoulder against which the lower end of the spacer bears, for example. The spacer is therefore wedged between this shoulder and the lower face of the pressure sensor, the upper face whereof is moreover fixed with respect to the upper end of the envelope by the retaining member. In conjunction with the retaining member, the shoulder of the envelope therefore provides means for fastening the lower end of the spacer to the envelope.

The device of the invention can be a glow plug. In this case, the finger includes a heating element, which is advantageously supplied with electrical power by a central conductor passing freely through the spacer.

The invention encompasses an internal combustion engine characterized in that it has at least one cylinder equipped with at least one device of the invention.

Figure 2:
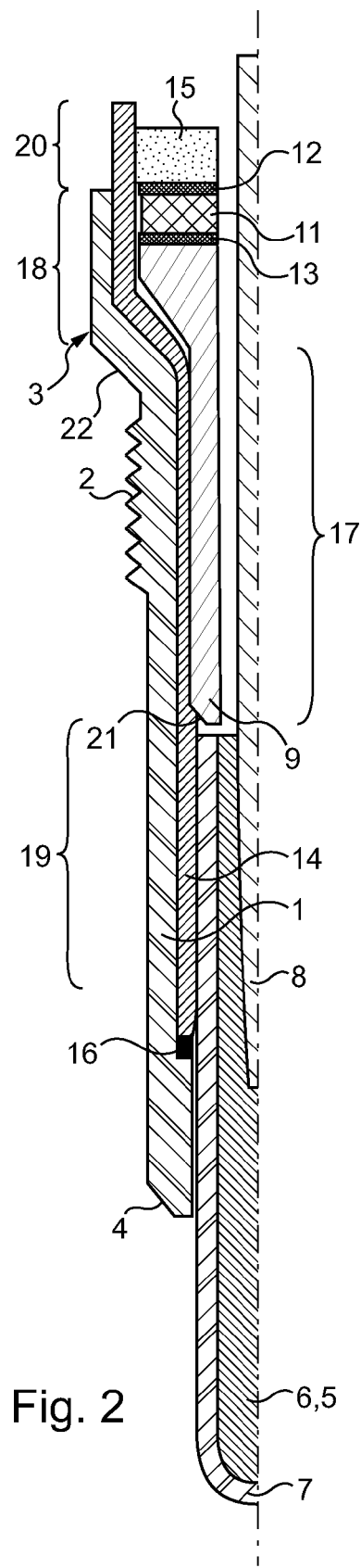

Other details and advantages of the present invention will appear on reading the following description, which refers to the appended diagrammatic drawings and relates to a preferred embodiment that is provided by way of nonlimiting example. In the drawings:

FIG. 1 is a diagrammatic perspective view of a glow plug of the invention, a quarter of which has been removed to show the interior of the glow plug, and FIG. 2 is a view in longitudinal section of one half of the glow plug from FIG. 1.

The glow plug shown in FIGS. 1 and 2 includes an external body 1, a preheating finger 5, a projecting part of which is outside the body 1 and the other part of which is inside said body, a central conductor 8, a pressure sensor 11-13, a retaining member 15 and a rigid spacer 9. According to the invention, it also includes an envelope 14 and preferably a damping element 16.

The body 1 has successively, on its external face, from the bottom upwards, an upwardly flared conical seat 4, a cylindrical portion, an external thread 2, an upwardly flared conical portion 22 and then a holding area 3 of hexagonal cross section. The hexagonal holding area 3 delimits a head of the glow plug, which is wider than the rest of the body. The glow plug is adapted to be mounted, and fastened by screwing, into a cylinder head (not shown) of an internal combustion engine, for example a diesel engine. To this end, the cylinder head is pierced by a bore opening into the combustion chamber of a cylinder of the engine. This bore includes a thread corresponding to the thread 2 on the body 1 (which thread provides means for anchoring the glow plug to the cylinder head), and a conical abutment adapted to cooperate with the seat 4 of said body 1. The glow plug is screwed into the cylinder head with the aid of the holding area 3, which remains outside the cylinder head (i.e. outside the engine). On completing this screwing, the seat 4 is pressed firmly against the conical abutment in the bore and therefore sealingly obturates the bore. When the glow plug has been mounted in the cylinder head in this way, its head extends outside the cylinder head and the engine, the remainder of the body 1 extends within the thickness of the cylinder head, and the projecting portion of the finger 5 extends in the combustion chamber of the cylinder.

The preheating finger 5 includes a heating core 6 (for example a metal core) and a protective sheath 7. The lower end of the central conductor 8 is crimped to the upper end of the core 6 of the finger 5 so as to be able to supply said core 6 with electrical energy. This central conductor 8 passes through the body 1 from the finger 5 to the upper end of said body, thereafter exiting the glow plug head to be connected to an electrical power supply cable (not shown).

The envelope 14 extends inside the body 1, except for its upper end. It surrounds successively, from the bottom upwards, an upper portion of the finger 5, the spacer 9, the pressure sensor 11-13 and the retaining member 15. It has successively (from the bottom upwards) a first substantially cylindrical portion facing the finger 5, a conical internal shoulder 21 (which could instead be plane), a second cylindrical portion the wall of which is of smaller cross sectional area than the first substantially cylindrical portion, an upwardly flared conical portion substantially following the conical portion of the body 1, a third cylindrical portion at the level of the glow plug head. The shoulder 21 of the envelope extends above the finger 5, preferably immediately above its upper end.

The envelope 14 is fixed to the finger 5 in a fixing area 19. To this end, the upper portion of the finger 5 is force fitted and/or tight fitted in the envelope. The envelope 14 is also fixed to the body 1 in a fixing area 18 in the upper portion of said body, to be more precise at its upper end, at the level of the glow plug head and therefore above the thread 2 of said body. This fixing can be achieved by a tight fit of the envelope in the body or by a screwing action, in which case the body 1 and the envelope 14 have respective and complementary threads. Between said fixing areas 18 and 19, the envelope is free with respect to the body. Moreover, between its shoulder 21 and its area 18 for fixing to the body, the envelope 14 includes an elastically deformable portion 17.

The pressure sensor 11-13 includes an annular piezo-electric element 11 disposed between two electrically conductive material contact members 12 and 13. The piezo-electric element 11, the contact members 12 and 13, and the spacer 9 described hereinafter each have a central opening for the central conductor 8 to pass through without rubbing.

The tubular spacer 9 has successively, from the bottom upwards, a conical (upwardly flared) lower end, a cylindrical portion, a conical portion substantially following the conical portion of the envelope 14 and thanks to which the spacer is flared in the direction of the pressure sensor 11-13, and then a cylindrical upper end. The upper end of the spacer 9 has an upper surface bearing against the pressure sensor. This bearing surface substantially corresponds to the lower surface of the contact member 13 (against which it bears). The lower (conical) end of the spacer 9 bears on the (conical) shoulder 21 of the envelope 14. Outside this lower end, the spacer 9 is free with respect to the envelope 14: there is a radial clearance between the spacer and the envelope to enable the elastically deformable portion 17 of the envelope to deform.

The pressure sensor is immobilized against upward axial movement by a retaining member 15, which can be an externally threaded nut screwed into a corresponding tapping formed in the envelope 14. The assembly formed by the spacer 9 and the pressure sensor 11-13 is therefore wedged between the retaining member 15 and the shoulder 21 of the envelope 14. The retaining member 15 is dimensioned, on the one hand, so that there is no play between the retaining member 15, the contact member 12, the piezo-electric element 11, the contact member 13, the spacer 9 and the shoulder 21 of the envelope and, on the other hand, so that the piezo-electric element 11 has a defined preload, i.e. is compressed to a given extent in the absence of any pressure exerted on the finger 5.

The device represented in the appended figures finally includes a heat conducting damping element 16 disposed between the lower end of the envelope 14 and the body 1. To this end, the body 1 advantageously has an internal shoulder receiving the damping element 16. This damping element is adapted to damp radial vibrations of the envelope 14 without preventing axial deformation thereof or transmitting to it axial forces resulting from distortion of the cylinder head that stress the body 1.

When the glow plug shown is mounted in an cylinder head, the pressure in the combustion chamber of the corresponding cylinder exerts an axial force on the finger 5 (an upward force in the event of increasing pressure or a downward force in the event of decreasing pressure). This force is transmitted by the finger 5 to the lower end of the envelope 14, the elastically deformable portion 17 of which is consequently deformed. This deformation displaces the spacer 9 proportionately. This displacement modifies the pressure exerted by the bearing surface of the spacer on the piezo-electric element 11 via the contact member 13. The piezo-electric element 11 converts the pressure that it receives into an electric field inducing a signal in the contact elements 12 and 13. This signal is therefore representative of the pressure in the combustion chamber.

According to the invention, the envelope 14 has a long elastically deformable portion 17 that is not exposed to the temperature in the combustion chamber or subjected to the distortions of the cylinder head. Its deformations are therefore only a function of the pressure exerted on the finger 5. The glow plug of the invention produces accurate and reliable results. Moreover, it is not necessary to calibrate the measuring sensor after fitting the glow plug into the cylinder head, as the deformation of the envelope 14 is not a function of the tightening torque applied to the glow plug.

The invention can be varied in many ways compared to the embodiment shown, provided that such variations fall within the scope delimited by the claims.

For example, the glow plug of the invention can include a ceramic preheating finger.

Moreover, the spacer can rest directly on the upper face of the finger and therefore be attached to it. The elastically deformable portion of the envelope can in this case extend between the upper face of the finger and the area for fixing the envelope to the body.

Alternatively, the pressure sensor can be immediately above the finger and the spacer above said sensor, wedged between the sensor (at the bottom) and a retaining member (at the top) such as the nut 15 shown. In this case also, the elastically deformable portion of the envelope can extend between the upper face of the finger and the area for fixing the envelope to the body. However, this solution is less advantageous than the solution shown because it imposes the use of a smaller pressure sensor, which reduces its sensitivity.

The invention claimed is:

1. Device incorporating a pressure sensor (11-13) for measuring pressures in a combustion chamber of a cylinder of an internal combustion engine, including:
    an external body (1),
    a finger (5) adapted to extend partly in the combustion chamber,
    an internal envelope (14) inserted into the body and surrounding an upper portion of the finger, which envelope is fixed on the one hand to the finger and on the other hand to the body and has an elastically deformable portion (17) between these two fixing areas,
    characterized in that the envelope (14) is fixed to the body (1) in a fixing area (18) that is in an upper part of said body.

2. Device according to claim 1, characterized in that the body (1) includes anchor means (2) for anchoring the device in a bore provided in a cylinder head, and in that the area (18) for fixing the envelope to the body extends above these anchor means (2).

3. Device according to claim 1, characterized in that the elastically deformable portion (17) of the envelope extends entirely inside the body (1).

4. Device according to claim 1, characterized in that the lower end of the envelope (14) extends inside the body (1).

5. Device according to claim 1, characterized in that it includes a damping element (16) between the body (1) and the envelope (14), which damping element (16) is thermally conductive and is adapted to damp radial vibrations of the envelope without preventing axial deformations of the envelope.

6. Device according to claim 5, characterized in that this damping element (16) is disposed between the lower end of the envelope (14) and the body (1).

7. Device according to claim 1, characterized in that it includes a rigid spacer (9) surrounded by the envelope, and in that the envelope (14) is fastened to a lower end of the spacer (9), the elastically deformable portion (17) of the envelope being between the lower end of the spacer and the area (18) for fixing the envelope to the body.

8. Device according to claim 1, characterized in that it includes a retaining member (15) fixed to the envelope (14) and against which an upper face of the pressure sensor (11-13) bears.

9. Device according to claim 1, characterized in that the finger (5) includes a heating element (6) supplied with electrical power by a central conductor (8).

10. Internal combustion engine characterized in that it includes at least one cylinder equipped with at least one device according to claim 1.

11. Device according to claim 2, characterized in that the elastically deformable portion (17) of the envelope extends entirely inside the body (1).

12. Device according to claim 2, characterized in that the lower end of the envelope (14) extends inside the body (1).

13. Device according to claim 2, characterized in that it includes a damping element (16) between the body (1) and the envelope (14), which damping element (16) is thermally conductive and is adapted to damp radial vibrations of the envelope without preventing axial deformations of the envelope.

14. Device according to claim 2, characterized in that it includes a rigid spacer (9) surrounded by the envelope, and in that the envelope (14) is fastened to a lower end of the spacer (9), the elastically deformable portion (17) of the envelope being between the lower end of the spacer and the area (18) for fixing the envelope to the body.

15. Device according to claim 2, characterized in that it includes a retaining member (15) fixed to the envelope (14) and against which an upper face of the pressure sensor (11-13) bears.

16. Device according to claim 2, characterized in that the finger (5) includes a heating element (6) supplied with electrical power by a central conductor (8).

* * * * *

UNITED STATES PATENT AND TRADEMARK OFFICE
CERTIFICATE OF CORRECTION

PATENT NO. : 8,356,511 B2  Page 1 of 1
APPLICATION NO. : 13/062369
DATED : January 22, 2013
INVENTOR(S) : Ramond et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 175 days.

Signed and Sealed this

First Day of September, 2015

Michelle K. Lee
*Director of the United States Patent and Trademark Office*